US008399098B2

(12) United States Patent
Bennison et al.

(10) Patent No.: US 8,399,098 B2
(45) Date of Patent: *Mar. 19, 2013

(54) LAMINATES COMPRISING IONOMER INTERLAYERS WITH LOW HAZE AND HIGH MOISTURE RESISTANCE

(75) Inventors: Stephen J. Bennison, Wilmington, DE (US); Richard Allen Hayes, Beaumont, TX (US); Steven C. Pesek, Orange, TX (US); W Alexander Shaffer, Orange, TX (US); Charles Anthony Smith, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 425 days.

This patent is subject to a terminal disclaimer.

(21) Appl. No.: 12/610,701

(22) Filed: Nov. 2, 2009

(65) Prior Publication Data

US 2010/0167061 A1  Jul. 1, 2010

Related U.S. Application Data

(60) Provisional application No. 61/141,836, filed on Dec. 31, 2008.

(51) Int. Cl.
| B32B 27/32 | (2006.01) |
| B32B 27/36 | (2006.01) |
| B32B 27/08 | (2006.01) |
| B32B 27/00 | (2006.01) |
| B32B 27/40 | (2006.01) |
| B32B 17/10 | (2006.01) |
| C08F 20/06 | (2006.01) |
| C08F 8/00 | (2006.01) |
| C08L 31/00 | (2006.01) |

(52) U.S. Cl. ........ 428/412; 428/523; 428/483; 428/516; 428/476.3; 428/424.2; 428/441; 526/317.1; 525/196; 524/556

(58) Field of Classification Search .................. 428/412, 428/523, 483, 516, 476.3, 424.2, 441; 526/317.1; 525/196; 524/556
See application file for complete search history.

(56) References Cited

U.S. PATENT DOCUMENTS

| 2,632,921 | A | 3/1953 | Kreidl |
| 2,648,097 | A | 8/1953 | Kritchever |
| 2,683,894 | A | 7/1954 | Kritchever |
| 2,704,382 | A | 3/1955 | Kreidl |
| 3,234,062 | A | 2/1966 | Morris |
| 3,311,517 | A | 3/1967 | Keslar, et al. |
| 3,344,014 | A | 9/1967 | Rees |
| 3,404,134 | A | 10/1968 | Rees |
| 3,762,988 | A | 10/1973 | Clock et al. |
| 3,852,136 | A | 12/1974 | Plumat et al. |
| 3,986,997 | A | 10/1976 | Clark |
| 4,027,073 | A | 5/1977 | Clark |
| 4,035,549 | A | 7/1977 | Kennar |
| 4,177,315 | A | 12/1979 | Ubersax |
| 4,341,576 | A | 7/1982 | Lewis |
| 4,355,135 | A | 10/1982 | January |
| 4,385,951 | A | 5/1983 | Pressau |
| 4,398,979 | A | 8/1983 | Cathers et al. |
| 4,469,743 | A | 9/1984 | Hiss |
| 4,615,989 | A | 10/1986 | Ritze |
| 4,663,228 | A | 5/1987 | Bolton et al. |
| 4,668,574 | A | 5/1987 | Bolton et al. |
| 4,732,814 | A | 3/1988 | Hatada et al. |
| 4,799,346 | A | 1/1989 | Bolton et al. |
| 4,865,711 | A | 9/1989 | Kittler |
| 5,002,820 | A | 3/1991 | Bolton et al. |
| 5,028,674 | A | 7/1991 | Hatch et al. |
| 5,069,942 | A | 12/1991 | Anderson |
| 5,173,212 | A | 12/1992 | Speit et al. |
| 5,264,286 | A | 11/1993 | Ando et al. |
| 5,411,845 | A | 5/1995 | Robinson |
| 5,415,909 | A | 5/1995 | Shohi et al. |
| 5,415,942 | A | 5/1995 | Anderson |
| 5,536,347 | A | 7/1996 | Moran |
| 5,567,529 | A | 10/1996 | Smith |
| 5,677,529 | A | 10/1997 | Hofmann et al. |

(Continued)

FOREIGN PATENT DOCUMENTS

| BR | 200401633-5 A | 12/2005 |
| BR | 200401634-3 A | 12/2005 |

(Continued)

OTHER PUBLICATIONS

D3418-08 "Standard Test Method for Transition Temperatures and Enthalpies of Fusion and Crystallization of Polymers by Differential Scanning Calorimetry", Dec. 2008, p. 1-8.*

(Continued)

Primary Examiner — Michael M Bernshteyn
(74) Attorney, Agent, or Firm — Maria M. Kourtakis; Kelly Law Registry; Tong T. Li

(57) ABSTRACT

A laminate comprises an ionomeric interlayer sheet which, in turn, comprises or is prepared from a sodium/zinc mixed ionomer that comprises carboxylate groups and a combination of counterions that consists essentially of sodium cations and zinc cations. The sodium/zinc mixed ionomer is the neutralization product of a precursor acid copolymer. The precursor acid copolymer comprises copolymerized units of an α-olefin and an α,β-ethylenically unsaturated carboxylic acid, and it has a melt flow rate of about 70 to about 1000 g/10 min. In addition, the precursor acid copolymer, when neutralized to a level of about 40% to about 90%, and when comprising counterions that consist essentially of sodium ions, produces a sodium ionomer that has a freeze enthalpy that is not detectable or that is less than about 3.0 j/g, when determined by differential scanning calorimetry.

16 Claims, No Drawings

U.S. PATENT DOCUMENTS

| | | | |
|---|---|---|---|
| 5,690,994 | A | 11/1997 | Robinson |
| 5,698,329 | A | 12/1997 | Robinson |
| 5,759,698 | A | 6/1998 | Tanuma et al. |
| 5,763,062 | A | 6/1998 | Smith et al. |
| 5,763,089 | A | 6/1998 | Chaussade et al. |
| 5,770,312 | A | 6/1998 | Robinson |
| 5,853,516 | A | 12/1998 | Lehto |
| 5,895,721 | A | 4/1999 | Naoumenko et al. |
| 5,958,534 | A | 9/1999 | Marbler et al. |
| 6,011,115 | A | 1/2000 | Miharu et al. |
| 6,150,028 | A | 11/2000 | Mazon |
| 6,265,054 | B1 | 7/2001 | Bravet et al. |
| 6,340,646 | B1 | 1/2002 | Nagashima et al. |
| 6,342,116 | B1 | 1/2002 | Balduin et al. |
| 6,432,522 | B1 | 8/2002 | Friedman et al. |
| 6,455,161 | B1 | 9/2002 | Regnier et al. |
| 6,461,736 | B1 | 10/2002 | Nagashima et al. |
| 6,468,934 | B2 | 10/2002 | Nagashima et al. |
| 6,518,365 | B1 | 2/2003 | Powell et al. |
| 7,189,457 | B2 | 3/2007 | Anderson |
| 7,641,965 | B1 | 1/2010 | Bennison et al. |
| 7,919,175 | B2 | 4/2011 | Bennison et al. |
| 7,951,865 | B1 | 5/2011 | Paul et al. |
| 2002/0155302 | A1 | 10/2002 | Smith et al. |
| 2003/0124296 | A1 | 7/2003 | Smith |
| 2004/0182493 | A1 | 9/2004 | Chick |
| 2004/0241479 | A1 | 12/2004 | Domine et al. |
| 2005/0037216 | A1 | 2/2005 | Chen et al. |
| 2005/0077002 | A1 | 4/2005 | Anderson et al. |
| 2006/0165929 | A1 | 7/2006 | Lenges et al. |
| 2006/0182983 | A1 | 8/2006 | Paul et al. |
| 2007/0092706 | A1 | 4/2007 | Pesek et al. |
| 2007/0122633 | A1 | 5/2007 | Pesek et al. |
| 2007/0289693 | A1 | 12/2007 | Anderson et al. |
| 2008/0023063 | A1 | 1/2008 | Hayes et al. |
| 2008/0044666 | A1 | 2/2008 | Anderson et al. |
| 2008/0269388 | A1* | 10/2008 | Markovich et al. ........... 524/210 |
| 2009/0242030 | A1 | 10/2009 | Kirschner et al. |
| 2009/0324935 | A1 | 12/2009 | Bennison et al. |
| 2010/0108126 | A1 | 5/2010 | Pesek et al. |
| 2010/0112253 | A1 | 5/2010 | Hausmann et al. |
| 2010/0112356 | A1 | 5/2010 | Bennison et al. |
| 2010/0166992 | A1 | 7/2010 | Hausmann et al. |
| 2010/0167061 | A1 | 7/2010 | Bennison et al. |

FOREIGN PATENT DOCUMENTS

| | | |
|---|---|---|
| EP | 1235683 B1 | 8/2003 |
| EP | 1759832 A1 | 7/2007 |
| JP | 2000186114 A | 7/2000 |
| JP | 200131801 A | 2/2001 |
| WO | 9101880 A1 | 2/1991 |
| WO | 9958334 A2 | 11/1999 |
| WO | 0006619 A1 | 2/2000 |
| WO | 01033978 A1 | 5/2001 |
| WO | 0160604 A1 | 8/2001 |
| WO | 03057478 A1 | 7/2003 |
| WO | 03068501 A1 | 8/2003 |
| WO | 2006005771 A1 | 1/2006 |
| WO | 2007079091 A1 | 7/2007 |
| WO | 2007149082 A1 | 12/2007 |

OTHER PUBLICATIONS

UserCom "The advantage of DSC cooling measurements for characterizing materials", Feb. 2004.*

PCT Search Report and Written Opinion for International application No. PCTUS09/62930 dated Dec. 24, 2009.

PCT Written Opinion of the International Preliminary Examining Authority for International application No. PCTUS09/62930 dated Dec. 6, 2011.

ASTM International Designation D 3418-99, Standard Test Method for Transition Temperatures of Polymers by Differential Scanning Calorimetry, 1999.

ASTM International Designation D3418-03, Standard Test Method for Transition Temperatues and Enthalpies of Fusion and Crystallization of Polymers by Differential Scanning Calorimetry, 2003.

ASTM International Designation D3418-08, Standard Test Method for Transition Temperatues and Enthalpies of Fusion and Crystallization of Polymers by Differential Scanning Calorimetry, 2008.

ASTM International Designation D3417-99, Standard Test Method for Enthalpies of Fusion and Crystallization of Polymers by Differential Scanning Calorimetry (DSC), 1999.

* cited by examiner

LAMINATES COMPRISING IONOMER INTERLAYERS WITH LOW HAZE AND HIGH MOISTURE RESISTANCE

CROSS-REFERENCE TO RELATED APPLICATION

This application claims priority under 35 U.S.C. §120 to U.S. Provisional Appln. No. 61/141,836, filed on Dec. 31, 2008, which is incorporated herein by reference in its entirety.

FIELD OF THE INVENTION

Provided herein are laminates that comprise a polymeric interlayer sheet which, in turn, comprises or is formed from a sodium/zinc mixed ionomer composition.

BACKGROUND OF THE INVENTION

Several patents and publications are cited in this description in order to more fully describe the state of the art to which this invention pertains. The entire disclosure of each of these patents and publications is incorporated by reference herein.

Safety laminates have been in commercial production for almost a century and have been utilized in applications that require sheet material having a high degree of clarity and impact resistance. For example, safety laminates have been widely used in the automobile industry as windshields or side windows because the laminate structures are characterized by high impact and penetration resistance and because they do not scatter glass shards and debris when shattered. More recently, safety laminates have also been incorporated into building structures as window, walls, stairs, etc.

Simple safety laminates typically consist of a sandwich of two glass sheets or panels bonded together with an interlayer of a polymeric sheet. One or both of the glass sheets may be replaced with optically clear rigid polymeric sheets, such as sheets made of polycarbonate. Safety glass laminates have further evolved to include multiple layers of glass and polymeric sheets bonded together with interlayers of polymeric sheets.

The interlayers used in safety laminates are typically made from relatively thick polymer sheets, which exhibit toughness and bondability to the glass in the event of a crack or crash. Widely used interlayer materials include complex, multicomponent compositions based on poly(vinyl butyral), poly(urethane), and ethylene vinyl acetate copolymers.

Ionomers are copolymers produced by partially or fully neutralizing the carboxylic acid groups of precursor or parent polymers that are acid copolymers comprising copolymerized residues of α-olefins and α,β-ethylenically unsaturated carboxylic acids. The use of ionomer interlayer sheets in safety laminates is known. See, for example, U.S. Pat. Nos. 3,344,014; 3,762,988; 4,663,228; 4,668,574; 4,799,346; 5,759,698; 5,763,062; 5,895,721; 6,150,028; 6,265,054; and 6,432,522, U.S. Patent Appln. Publn. Nos. 2002/0155302; 2006/0182983; 2007/0092706; 2007/0122633; 2007/0289693; 2008/0044666, and PCT Patent Appln. Publn. Nos. WO99/58334; WO2006/057771; and WO2007/149082.

In this connection, ionomers have been useful in safety laminates intended for structures requiring a high degree of penetration resistance. Some examples include hurricane-resistant glazing and structural elements such as glass staircases and glass balustrades. In particularly demanding applications, the use of ionomeric interlayer sheets in safety laminates having ballistic resistance is described in, e.g., U.S. Pat. No. 5,002,820 and PCT Patent Appln. Publn. No. WO03/068501.

One way to improve ballistic resistance of a safety laminate is to increase the number of laminate layers or the thickness of the laminate layers. As the total thickness of the interlayer material in a safety laminate increases, however, any deficiency in the material's optical properties, such as haze, for example, increases in significance. These deficiencies may be exacerbated by the slower cooling rates typical of thicker safety laminates, which are more conducive to the formation of crystals.

There is still a need, however, to develop an ionomer composition that is useful in safety laminates and that is capable of retaining good optical properties and good moisture resistance when used at greater thicknesses, or when the manufacturing process requires slower cooling conditions.

SUMMARY OF THE INVENTION

Provided herein is a laminate that comprises at least one interlayer sheet that is laminated to one or more other interlayer sheets, to one or more rigid sheets or to one or more film layers. The interlayer sheet comprises or is prepared from a sodium/zinc mixed ionomer that comprises carboxylate groups and a combination of counterions. This combination consists essentially of about 5 to about 95 equivalent % of sodium cations, and, complementarily, about 95 to 5 equivalent % of zinc cations, based on the total number of equivalents of carboxylate groups in the sodium/zinc mixed ionomer.

The sodium/zinc mixed ionomer is the neutralization product of a precursor acid copolymer. The precursor acid copolymer comprises copolymerized units of an α-olefin having 2 to 10 carbon atoms and about 20 to about 30 wt % of copolymerized units of an α,β-ethylenically unsaturated carboxylic acid having 3 to 8 carbon atoms, based on the total weight of the precursor acid copolymer. In addition, the precursor acid copolymer has a melt flow rate of about 70 to about 1000 g/10 min, as determined in accordance with ASTM D1238 at 190° C. and 2.16 kg; and, when neutralized to a level of about 40% to about 90%, based on the total number of the carboxylic acid groups present in the precursor acid copolymer, to comprise carboxylate groups and counterions that consist essentially of sodium ions, the precursor acid copolymer produces a sodium ionomer that has a freeze enthalpy that is not detectable or that is less than about 3.0 j/g, when determined by differential scanning calorimetry in accordance with ASTM D3418.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Unless otherwise specified under limited circumstances, all melt flow rates are measured according to ASTM method D1238 at a polymer melt temperature of 190° C. and under a weight of 2.16 kg. Moreover, the terms melt flow rate (MFR), melt flow index (MFI) and melt index (MI) are synonymous and used interchangeably herein.

The terms "freeze enthalpy", "heat of crystallization" and "enthalpy of crystallization", as used herein, are synonymous and interchangeable. The terms "heat of crystallization" and "enthalpy of crystallization" are defined in ASTM Method No. D3418, published in Dec. 2008.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an $\alpha$-olefin, an $\alpha,\beta$-ethylenically unsaturated carboxylic acid, and optionally other suitable comonomer(s) such as, an $\alpha,\beta$-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer (or sodium neutralized mixed ionomer), for example a copolymer of ethylene and methacrylic acid wherein all or a portion of the carboxylic acid groups of the copolymerized methacrylic acid units are in the form of sodium carboxylate groups.

Provided herein is a laminate comprising at least one rigid sheet layer or at least one film layer and at least one interlayer sheet, wherein the interlayer sheet comprises a sodium/zinc mixed ionomer composition.

The sodium/zinc mixed ionomer composition comprises or is prepared from a sodium/zinc mixed ionomer that is an ionic, neutralized derivative of a precursor acid copolymer. The precursor acid copolymer comprises copolymerized units of an α-olefin having 2 to 10 carbons and copolymerized units of an α,β-ethylenically unsaturated carboxylic acid having 3 to 8 carbon atoms. Preferably, the precursor acid copolymer comprises about 20 to about 30 wt %, or about 20 to about 25 wt %, based on the total weight of the precursor acid copolymer, of the copolymerized carboxylic acid. The amount of copolymerized α-olefin is complementary to the amount of copolymerized carboxylic acid and other comonomers, if present, so that the sum of the weight percentages of the comonomers in the precursor acid copolymer is 100 wt %.

Suitable α-olefin comonomers include, but are not limited to, ethylene, propylene, 1-butene, 1-pentene, 1-hexene, 1-heptene, 3 methyl-1-butene, 4-methyl-1-pentene, and the like and combinations of two or more of these α-olefins. In one embodiment, the α-olefin is ethylene.

Suitable α,β-ethylenically unsaturated carboxylic acid comonomers include, but are not limited to, acrylic acids, methacrylic acids, itaconic acids, maleic acids, maleic anhydrides, fumaric acids, monomethyl maleic acids, and combinations of two or more of these acid comonomers. In one embodiment, the α,β-ethylenically unsaturated carboxylic acid is selected from acrylic acids, methacrylic acids, and combinations of two or more (meth)acrylic acids.

The precursor acid copolymer may further comprise copolymerized units of other comonomer(s), such as unsaturated carboxylic acids having 2 to 10, or 3 to 8 carbon atoms, or derivatives thereof. Suitable acid derivatives include acid anhydrides, amides, and esters. Some suitable precursor acid copolymers further comprise an ester of the unsaturated carboxylic acid. Examples of suitable esters of unsaturated carboxylic acids include, but are not limited to, those that are set forth in U.S. Patent Appln. Publn. No. US2010/0112253, by Hausmann et al. Examples of preferred comonomers include, but are not limited to, methyl (meth)acrylates, butyl (meth) acrylates, glycidyl methacrylates, vinyl acetates, and combinations of two or more thereof. Preferably, however, the precursor acid copolymer does not incorporate other comonomers in any significant amount.

The precursor acid copolymer may have a melt flow rate (MFR) of about 10 to about 4000 g/10 min, about 10 to about 2500 g/10 min, about 10 to about 1400 g/10 min, about 35 to about 1200 g/10 min, about 70 to about 1000 g/10 min, about 100 to about 500 g/10 min, or about 200 to about 500 g/10 min, as determined in accordance with ASTM method D1238 at 190° C. and under a weight of 2.16 kg.

Combinations of precursor acid copolymers are also suitable, provided that the properties of the copolymers are within the ranges described herein. For example, two or more dipolymers having differing amounts of copolymerized carboxylic acid comonomer or differing melt indices may be used. Also, a combination of precursor acid copolymers including a dipolymer and a terpolymer may be suitable.

The precursor acid copolymers may be synthesized by methods that are described in detail in U.S. Patent Appln. Publn. No. US2010/0112253, cited above. When a precursor acid copolymer synthesized by these methods is neutralized with a sodium ion-containing base to a level of about 40% to about 90%, or about 40% to about 70%, or about 43% to about 60%, based on the total carboxylic acid content of the precursor acid copolymers as calculated or measured for the non-neutralized precursor acid copolymers, and when the resulting sodium (neutralized) ionomer has a MFR of about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg, then the sodium ionomer has a freeze enthalpy that is not detectable or less than about 3 j/g, or less than about 2 j/g, as determined by differential scanning calorimetry (DSC) in accordance with ASTM method D3418 when using a DSC apparatus manufactured by Mettler or by TA (for example the Universal V3.9A model).

The term "not detectable", as used in this context, refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 j/g is not detectable. The precursor acid copolymers and their sodium ionomers are described in detail in Applicants' co-pending U.S. Patent Appln. Publn. No. US2010/0108126, by Pesek et al.

To obtain the sodium neutralized ionomers, the zinc neutralized ionomers, or the sodium/zinc mixed ionomers described herein, the precursor acid copolymers may be neutralized by any conventional procedure, such as those described in U.S. Pat. Nos. 3,404,134 and 6,518,365, and by other procedures that will be apparent to those of ordinary skill in the art. These methods are described in detail in U.S. Patent Appln. Publn. No. US2010/0166992, by Hausmann et al. For example, the precursor acid copolymer may be neutralized with a combination of sodium and zinc ion-containing bases, or sequentially with a sodium ion-containing base and a zinc ion-containing base. Alternatively, the sodium/zinc mixed ionomer may also be prepared by melt blending a sodium neutralized ionomer and a zinc neutralized ionomer, each derived from a precursor acid copolymer as described above. The combination of the sodium and zinc cations present in the resulting ionomers may comprise about 1 to about 99 equiv %, or about 5 to about 95 equiv %, or about 50 to about 95 equiv %, or about 50 to about 80 equiv %, or about 50 to about 70 equiv %, or about 50 to about 60 equiv %, or about 55 to about 80 equiv %, or about 55 to about 70 equiv %, or about 60 to about 70 equiv %, of the sodium cations, based on the number of equivalents of carboxylate anions in the ionomer, with the balance of the equivalent percentage being made up of the zinc cations.

The sodium/zinc mixed ionomer composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities of about 0.01 to about 15 wt %, or about 0.01 to about 10 wt %, so long as they do not detract from the basic and novel characteristics of the composition and do not significantly adversely affect the performance of the composition or of the articles prepared from the composition. In this connection, the weight percentages of such additives are not included in the total weight percentages of the thermoplastic compositions defined herein. Typically, such additives are present in an amount of about 0.01 to about 5 wt %, based on the total weight of the ionomer composition.

Three notable additives are thermal stabilizers, UV absorbers, and hindered amine light stabilizers. These additives are described in detail in U.S. Patent Appln. Publn. No. US2010/0166992, cited above. A fourth notable additive is a silane coupling agent, which may be added to the sodium/zinc mixed ionomer composition to improve its adhesive strength. Examples of suitable silane coupling agents that are useful in the compositions described herein include, but are not limited to, γ-chloropropylmethoxysilane, vinyltrimethoxysilane, vinyltriethoxysilane, vinyltris(β-methoxyethoxy)silane, γ-vinylbenzylpropyl-trimethoxysilane, N-β-(N-vinylbenzylaminoethyl)-γ-aminopropyltrimethoxy-silane, γ-methacryloxypropyl-trimethoxysilane, vinyltriacetoxysilane, γ-glycidoxypropyl-trimethoxysilane, γ-glycidoxypropyltriethoxysilane, β-(3,4-epoxycyclohexyl)-ethyltrimethoxysilane, vinyltrichlorosilane, γ-mercapto-propylmethoxysilane, γ-aminopropyltriethoxy-silane, N-β-(aminoethyl)-γ-aminopropyltrimethoxysilane, and combinations of two or more thereof. The silane coupling agents may be incorporated in the sodium/zinc mixed ionomer composition at a level of about 0.01 to about 5 wt %, or about 0.05 to about 1 wt %, based on the total weight of the sodium/zinc mixed ionomer composition.

The optional incorporation of such conventional ingredients into the compositions can be carried out by any known process. This incorporation can be carried out, for example, by dry blending, by extruding a combination of the various constituents, by a masterbatch technique, or the like. See, again, the *Kirk-Othmer Encyclopedia*.

Further provided are polymeric sheets comprising the sodium/zinc mixed ionomer composition described herein. These polymeric sheets possess higher clarity and moisture resistance, compared to those sheets formed of prior art ionomers. In particular, as illustrated in the example section below, when a polymer sheet comprising the composition described herein and having a thickness of 2.28 mm is laminated between two sheets of 3 mm thick annealed glass, the resulting glass laminate has a percent haze level less than about 5%, or less than about 3%, independent of the cooling rate that was used during the lamination process. In addition, another polymer sheet made of the sodium/zinc mixed ionomer has a moisture weight gain of less than about 5%, or less than about 3%, after immersion in water for 1000 hours at 23° C.

The interlayer sheet comprising or produced from the sodium/zinc mixed ionomer composition may be in a single layer or in multilayer form. By "single layer", it is meant that the sheet is made from or consists essentially of the sodium/zinc mixed ionomer composition. When in a multilayer form, at least one of the sub-layers comprises, is produced from, is made of or consists essentially of the sodium/zinc mixed ionomer composition, while the other sub-layer(s) comprise or are made from any other suitable polymeric material(s), such as, for example, other acid copolymers, ionomers of other acid copolymers, poly(ethylene vinyl acetates), poly(vinyl acetals) (including acoustic grade poly(vinyl acetals)), polyurethanes, polyvinylchlorides, polyethylenes (e.g., linear low density polyethylenes), polyolefin block copolymer elastomers, copolymers of α-olefins and α,β-ethylenically unsaturated carboxylic acid esters (e.g., ethylene methyl acrylate copolymers and ethylene butyl acrylate copolymers), silicone elastomers, epoxy resins, and combinations of two or more thereof. In addition, when two or more sublayers are present in the polymeric interlayer sheets, the sublayers may be formed of polymeric materials that are the same or different.

The sheet comprising the sodium/zinc mixed ionomer composition may have a total thickness of about 1 to about 120 mils (about 0.025 to about 3 mm), or about 5 to about 100 mils (about 0.127 to about 2.54 mm), or about 5 to about 45 mils (about 0.127 to about 1.14 mm), or about 10 to about 30 mils (about 0.25 to about 0.76 mm), or about 10 to about 20 mils (about 0.25 to about 0.51 mm).

Further, the sheet comprising the sodium/zinc mixed ionomer composition may have a smooth or rough surface on one or both sides to facilitate deaeration during the lamination process. Rough surfaces can be created by known processes such as mechanical embossing or by melt fracture during extrusion of the sheets, or by processes described in, e.g., U.S. Pat. No. 4,035,549 and U.S. Patent Publication No. 2003/0124296.

The sheets comprising the sodium/zinc mixed ionomer composition can be produced by any suitable process. For example, the sheets may be formed through dipcoating, solution casting, compression molding, injection molding, lamination, melt extrusion casting, blown film processes, extrusion coating, tandem extrusion coating, or by any other procedures that are known to those of skill in the art. In certain embodiments, the sheets may be formed by melt extrusion casting, melt coextrusion casting, melt extrusion coating, or tandem melt extrusion coating processes.

Further provided are laminates comprising, as interlayers, the polymeric sheets described herein. One preferred laminate comprises at least one interlayer sheet comprising or produced from the sodium/zinc mixed ionomer composition, and the interlayer sheet is laminated to at least one rigid sheet or film layer. By "laminated", it is meant that, within a laminated structure, the two layers are adhered or bonded to each other either directly (i.e., without any additional material between the two layers) or indirectly (i.e., with additional material, such as interlayer or adhesive materials, between the two layers).

Suitable rigid sheets comprise a material with a modulus of about 100,000 psi (690 MPa) or greater (as measured by ASTM Method D-638). The rigid sheets may be formed of glass, metal, ceramic, or of polymers including polycarbonates, acrylics, polyacrylates, cyclic polyolefins, polystyrene prepared in the presence of metallocene catalysts, and combinations of two or more thereof.

The term "glass" includes not only window glass, plate glass, silicate glass, sheet glass, low iron glass, tempered glass, tempered CeO-free glass, and float glass, but also colored glass, specialty glass (such as those containing ingredients to control solar heating), coated glass (such as those sputtered with metals (e.g., silver or indium tin oxide) for solar control purposes), low E-glass, Toroglas™ glass (Saint-Gobain N.A. Inc., Trumbauersville, Pa.), Solexia™ glass (PPG Industries, Pittsburgh, Pa.) and Starphire™ glass (PPG Industries). Such specialty glasses are described in, e.g., U.S. Pat. Nos. 4,615,989; 5,173,212; 5,264,286; 6,150,028; 6,340,646; 6,461,736; and 6,468,934. It is understood, however, that the type of glass to be selected for a particular laminate depends on the intended end use or application of the laminate.

Suitable film layers may be metal (such as aluminum foil) or polymeric. Polymeric film materials include, but are not limited to, polyesters (e.g., poly(ethylene terephthalate) (PET) and poly(ethylene naphthalate)), polycarbonates, polyolefins (e.g., polypropylene, polyethylene, and cyclic polyolefins), norbornene polymers, polystyrenes (e.g., syndiotactic polystyrene), styrene-acrylate copolymers, acrylonitrile-styrene copolymers, polysulfones (e.g., polyethersulfone, and polysulfone), polyamides, polyurethanes, acrylic polymers, cellulose acetates (e.g., cellulose acetate and cellulose triacetates), cellophanes, vinyl chloride polymers (e.g., poly(vinyl chloride) and poly(vinylidene chloride)), fluoropolymers (e.g., poly(vinyl fluoride), poly(vinylidene fluoride), polytetrafluoroethylene, and ethylene-tetrafluoroethylene copolymers), and combinations of two or more thereof.

When the polymeric film is located at the outside surface of the safety laminate, it may be further coated with an abrasion resistant hardcoat. Any material known for use in abrasion resistant hardcoats may be used herein. For example, the hardcoat may comprise polysiloxanes (see e.g., U.S. Pat. Nos. 3,986,997; 4,027,073, 4,177,315; 4,355,135; and 5,069,942) or cross-linked (thermosetting) polyurethanes. Also suitable are oligomeric-based coatings, such as those described in U.S. Patent Application Publication No. 20050077002, which are prepared by the reaction of (A) hydroxyl-containing oligomer with isocyanate-containing oligomer or (B) anhydride-containing oligomer with epoxide-containing compound. In certain laminates, the hardcoat may comprise a polysiloxane abrasion resistant coating, such as those described in U.S. Pat. Nos. 4,177,315; 4,469,743; 5,415,942; and 5,763,089.

The safety laminates may further comprise other polymeric interlayer sheets formed of polymeric materials, such as poly(vinyl acetal) (e.g., poly(vinyl butyral) (PVB)), poly (vinyl chloride), polyurethane, ethylene/vinyl acetate copolymers, acid copolymers, other ionomers, or combinations of two or more thereof. In addition, when two or more polymeric sheets are incorporated in the safety laminate, the polymeric interlayer sheets may be formed of polymeric materials that are the same or different.

Each of the interlayer sheets comprising the sodium/zinc mixed ionomer composition and each of the other polymeric interlayer sheets comprised in the safety laminates may have a thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm).

One preferred laminate comprises (a) a first rigid sheet or film layer, which is laminated to (b) a sheet comprising the sodium/zinc mixed ionomer composition, which is laminated to (c) a second rigid sheet or film layer. For example, the safety laminate may comprise two glass sheets with an interlayer sheet comprising the sodium/zinc mixed ionomer composition laminated between the two glass sheets, or the safety laminate may comprise a glass sheet and a hardcoated polyester film with an interlayer sheet comprising the ionomer sodium/zinc mixed ionomer composition laminated between the glass sheet and the hardcoated plastic film.

Another preferred laminate may comprise n plies of rigid sheet or film layers (such as glass sheet layers) and n−1 plies of polymer interlayer sheets, wherein (a) each adjacent pair of the rigid sheet or film layers are interspaced by one of the polymer interlayer sheets; (b) at least one, or each of the polymer interlayer sheets is the interlayer sheet comprising the sodium/zinc mixed ionomer composition described above, and (c) n is an integer between 2 and 10, inclusive.

Such safety laminates are described at length in U.S. Patent No. 7,641,965, issued on Jan. 5, 2010, to Bennison et al.

Some examples of laminates include, but are not limited to, rigid sheet/interlayer sheet; glass sheet/interlayer sheet; polycarbonate rigid sheet/interlayer sheet; acrylic rigid sheet/interlayer sheet; polymer film/interlayer sheet; bi-axially oriented PET film/interlayer sheet; rigid sheet/interlayer sheet/polymer film; glass sheet/interlayer sheet/polymer film; polycarbonate rigid sheet/interlayer sheet/polymer film; acrylic rigid sheet/interlayer sheet/polymer film; rigid sheet/interlayer sheet/rigid sheet; glass sheet/interlayer sheet/glass sheet; polycarbonate rigid sheet/interlayer sheet/polycarbonate rigid sheet; acrylic rigid sheet/interlayer sheet/acrylic rigid sheet; polymeric film/interlayer sheet/polymer film; rigid sheet/interlayer sheet/polymer film/interlayer sheet/rigid sheet; glass sheet/interlayer sheet/polymer film/interlayer sheet/glass sheet; glass sheet/interlayer sheet/polymer film/interlayer sheet/glass sheet; and glass sheet/interlayer sheet/polymer film/interlayer sheet/polymer film; wherein "/" indicates adjacent layers and, among the interlayer sheet (s) present in each laminate, at least one is an interlayer sheet comprising the sodium/zinc mixed ionomer composition described above. Moreover, when two or more of the same layer (polymer films, for example) are present in the same laminate, they may be the same as or different from each other. Furthermore, in some laminates, the adjacent layers may be laminated directly to each other so that they are adjoining or contiguous in the laminate structure.

Further provided herein are safety laminates having ballistic resistance. Ballistic resistant safety laminates may comprise multiple rigid sheets, such as glass sheets, and multiple polymer interlayer sheets, wherein each adjacent pair of the rigid sheets is interspaced by one of the polymer interlayer sheets and at least one of the polymer interlayer sheets is the interlayer sheet comprising the sodium/zinc mixed ionomer composition described above.

The ballistic resistant safety laminate may further comprise a polymer film or sheet positioned in the laminate as an outermost layer facing away from the impact force. The polymer sheet used in the anti-spall zone may be a polycarbonate sheet and the polymer film used in the anti-spall zone may be selected from polyester films (e.g., bi-axially oriented PET films) and fluoropolymer films (e.g., poly(vinyl fluoride) films and poly(vinylidene fluoride) films). Some fluoropolymer films are commercially available from E. I. du Pont de Nemours and Company, Wilmington, Del. (DuPont) under the trademarks Tedlar® and Tefzel®. In certain laminates, the polymer film may be a bi-axially oriented PET film. Or, the polymer film may be a bi-axially oriented PET film having (i) a tensile modulus of about 600,000 psi (4.14 GPa) or higher at both machine direction (MD) and transverse direction (TD), (ii) a shock brittleness index of about 55 joule or higher at MD and about 25 joule or higher at TD, and (iii) a percent elongation at break (EOB) of about 110 to about 160 at MD and about 60 to about 110 at TD. Examples of these PET films are described in detail in U.S. Patent Appln. Publn. No. US2009/0242030, by Kirschner et al.

In one example, the ballistic resistant safety laminate comprises an impact zone and, adhered firmly to the impact zone, an anti-spall zone, wherein the impact zone faces to the impact force and comprises n glass sheets and (n−1) polymer interlayer sheets with (i) each adjacent pair of the glass sheets interspaced by one of the polymer interlayer sheet; (ii) n being an integer such that $2 \leq n \leq 10$; and (iii) at least one of the polymer interlayer sheets being the interlayer sheet comprising the sodium/zinc mixed ionomer composition described above; and wherein the anti-spall zone faces away from the impact force and comprises an additional polymer sheet (e.g., a PVB sheet) and a polymer film (e.g., a PET film) with a first surface of the polymer sheet adhered firmly to the impact zone and a second surface of the polymer sheet adhered firmly to the polymer film. Again, ballistic resistant laminates of this type and methods of making the laminates are described in greater detail in co-pending U.S. Pat. No. 7,641,965, cited above.

The ballistic resistant safety laminates described here may take any form known in the art. Some examples of preferred constructions include, but are not limited to, rigid sheet/interlayer sheet/rigid sheet/interlayer sheet/ rigid sheet;

glass sheet/interlayer sheet/glass sheet/interlayer sheet/ glass sheet;

glass sheet/interlayer sheet/glass sheet/interlayer sheet/ rigid sheet;

glass sheet/interlayer sheet/glass sheet/polyurethane sheet/ polycarbonate sheet;

glass sheet/interlayer sheet/glass sheet/interlayer sheet/ acrylic rigid sheet;

rigid sheet/interlayer sheet/rigid sheet/polymer sheet/polymer film (e.g., hardcoated bi-axially oriented PET film);

glass sheet/interlayer sheet/glass sheet/polymer sheet/ polymer film;

rigid sheet/interlayer sheet/rigid sheet/polymer sheet/polymer film;

rigid sheet/interlayer sheet/rigid sheet/PVB sheet/polymer film;

glass sheet/interlayer sheet/glass sheet/PVB sheet/bi-axially oriented PET film;

rigid sheet/interlayer sheet/rigid sheet/interlayer sheet/ rigid sheet/interlayer sheet/rigid sheet;

glass sheet/interlayer sheet/glass sheet/interlayer sheet/ glass sheet/interlayer sheet/rigid sheet;

glass sheet/interlayer sheet/glass sheet/interlayer sheet/ glass sheet/polyurethane sheet/polycarbonate sheet;

glass sheet/interlayer sheet/glass sheet/interlayer sheet/ glass sheet/interlayer sheet/acrylic rigid sheet;

rigid sheet/interlayer sheet/rigid sheet/interlayer sheet/ rigid sheet/polymer sheet/polymer film;

glass sheet/interlayer sheet/glass sheet/interlayer sheet/ glass sheet/polymer sheet/polymer film;

glass sheet/interlayer sheet/glass sheet/interlayer sheet/ glass sheet/polymer sheet/bi-axially oriented PET film;

glass sheet/interlayer sheet/glass sheet/interlayer sheet/ glass sheet/PVB sheet/bi-axially oriented PET film;

rigid sheet/interlayer sheet/rigid sheet/interlayer sheet/ rigid sheet/interlayer sheet/rigid sheet/interlayer sheet/ rigid sheet;

glass sheet/interlayer sheet/glass sheet/interlayer sheet/ glass sheet/interlayer sheet/glass sheet/interlayer sheet/ glass sheet;

glass sheet/interlayer sheet/glass sheet/interlayer sheet sheet/glass sheet/interlayer sheet/glass sheet/interlayer sheet/rigid sheet;

glass sheet/interlayer sheet/glass sheet/interlayer sheet/ glass sheet/interlayer sheet/glass sheet/polyurethane sheet/polycarbonate sheet;

glass sheet/interlayer sheet/glass sheet/interlayer sheet/ glass sheet/interlayer sheet/glass sheet/polymer sheet/ acrylic rigid sheet;

rigid sheet/interlayer sheet/rigid sheet/interlayer sheet/ rigid sheet/interlayer sheet/rigid sheet/polymer sheet/ polymer film;

glass sheet/interlayer sheet/glass sheet/interlayer sheet/ glass sheet/interlayer sheet/glass sheet/polymer sheet/ polymer film;

glass sheet/interlayer sheet/glass sheet/interlayer sheet/ glass sheet/interlayer sheet/glass sheet/polymer sheet/ bi-axially oriented PET film;

glass sheet/interlayer sheet/glass sheet/interlayer sheet/ glass sheet/interlayer sheet/glass sheet/PVB sheet/bi-axially oriented PET film;

rigid sheet/interlayer sheet/rigid sheet/interlayer sheet/ rigid sheet/interlayer sheet/rigid sheet/interlayer sheet/ rigid sheet/interlayer sheet/rigid sheet;

glass sheet/interlayer sheet/glass sheet/interlayer sheet/ glass sheet/interlayer sheet/glass sheet/interlayer sheet/ glass sheet/interlayer sheet/glass sheet;

rigid sheet/interlayer sheet/rigid sheet/interlayer sheet/ rigid sheet/interlayer sheet/rigid sheet/interlayer sheet/ rigid sheet/polymer sheet/polymer film; and glass sheet/interlayer sheet/glass sheet/interlayer sheet/ glass sheet/interlayer sheet/glass sheet/interlayer sheet/ glass sheet/polymer sheet/polymer film;

wherein the same notes apply as above with respect to other examples of safety laminates; specifically, repeated layers may be the same or different, and "/" indicates layers that may be adjacent, adjoining or contiguous.

If desired, one or both surfaces of any of the component layers comprised in the safety laminate may be treated prior to the lamination process to enhance the adhesion to other laminate layers. This adhesion enhancing treatment may take any form known within the art and includes flame treatments (see, e.g., U.S. Pat. Nos. 2,632,921; 2,648,097; 2,683,894; and 2,704,382), plasma treatments (see e.g., U.S. Pat. No. 4,732, 814), electron beam treatments, oxidation treatments, corona discharge treatments, chemical treatments, chromic acid treatments, hot air treatments, ozone treatments, ultraviolet light treatments, sand blast treatments, solvent treatments, and combinations of two or more thereof. Also, the adhesion strength may be further improved by further applying an adhesive or primer coating on the surface of the laminate layer(s). For example, U.S. Pat. No. 4,865,711 describes a film or sheet with improved bondability, which has a thin layer of carbon deposited on one or both surfaces. Other exemplary adhesives or primers may include silanes, poly (allyl amine) based primers (see e.g., U.S. Pat. Nos. 5,411, 845; 5,770,312; 5,690,994; and 5,698,329), and acrylic based primers (see e.g., U.S. Pat. No. 5,415,942). The adhesive or primer coating may take the form of a monolayer of the adhesive or primer and have a thickness of about 0.0004 to about 1 mil (about 0.00001 to about 0.03 mm), or about 0.004 to about 0.5 mil (about 0.0001 to about 0.013 mm), or about 0.004 to about 0.1 mil (about 0.0001 to about 0.003 mm).

Any lamination process known within the art (such as an autoclave process or a non-autoclave process) may be used to prepare the safety laminates. For example, the laminate may be made by an autoclave process, such as described in U.S. Pat. No. 3,311,517, or a non-autoclave lamination process, such as described in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 2004/ 0182493, European Patent No. EP 1 235 683 B1, PCT Patent Publication Nos. WO91/01880 and WO03057478.

The following examples are provided to describe the invention in further detail. These examples, which set forth a preferred mode presently contemplated for carrying out the invention, are intended to illustrate and not to limit the invention.

EXAMPLES

Comparative examples CE1 to CE19

The ionomers used in each of the following examples were prepared as follows. First, the precursor acid copolymers (i.e., the copolymers of ethylene and methacrylic acid) of the ionomers, were produced by free radical polymerization in an adiabatic continuous stirred autoclave, substantially according to the procedure described in Example 1 of U.S. Pat. No. 5,028,674 with the following exceptions: (1) by controlling the ratio of ethylene to methacrylic acid and the flow rate of the initiator, the reactor conditions were maintained at a temperature of about 200° C. to about 260° C. and at a pressure of between 170 and 240 MPa; (2) no propane telogen was fed in the reactor (except in CE16); (3) the total concentration of methanol in the reactor was maintained at about 2 to 5 mol %, based on the total feed of ethylene, methacrylic acid, methanol and initiator solution (or based on the total feed of propane telogen, ethylene, methacrylic acid, methanol, and initiator solution in CE16); and (4) the system was maintained at a steady state with the residence time of the material flowing through the reactor being about 5 seconds to 2 minutes. In addition, depending on the particular acid copolymer to be synthesized, one of two different free-radical initiators were used, tert-butyl peracetate or tert-butyl peroctoate. When tert-butyl peracetate was the initiator (as in Comparative Examples CE1 to CE6, CE16, and CE18), it was utilized as a solution in odorless mineral spirits at 50% concentration. When tert-butyl peroctoate was the initiator (as in Comparative Examples CE7 to CE15, CE17, and CE19), it was utilized as a mixture at 90% concentration in odorless mineral spirits. The ionomers were obtained by partially neutralizing the precursor copolymers of ethylene and methacrylic acid with sodium hydroxide solution either in a single screw extruder under high shear melt mixing conditions with the melt temperature set at 200° C. to 270° C., or using the general method described in Example 1 of U.S. Pat. No. 6,518,365.

The as-obtained ionomers then underwent differential scanning calorimetry (DSC) testing in accordance with ASTM D3418 with a temperature profile of (a) heating to 180° C.; (b) holding for 3 minutes; (c) cooling to 25° C. at a rate of 10° C./min; (d) holding for 3 minutes; and (e) heating to 180° C. at a rate of 10° C./min. The freeze enthalpies for the ionomers were determined and are reported in Table 2. The results demonstrate that a freeze enthalpy for each of the sodium ionomers prepared by neutralizing the precursor acid copolymer described above using sodium ion-containing bases (Comparative Examples CE1 to CE3) was not detectable, while each of the ionomers prepared by neutralizing the prior art precursor acid copolymers (Comparative Examples CE4 to CE19) has a freeze enthalpy greater than 3 j/g.

Further, the ionomers were fed into 25 mm diameter Killion extruders under the temperature profile set forth in Table 1 and extrusion cast into polymer sheets. Specifically, the polymer throughput was controlled by adjusting the screw speed to maximum throughput, a 150 mm slot die with a nominal gap of 2 mm was fed by the extruder, the cast sheet was fed onto a 200 mm diameter polished chrome chill roll held at a temperature of between 10° C. and 15° C. and rotating at 1 to 2 rpm. The nominally 0.76 mm (30 mil) thick sheets were then removed and cut into 300×300 mm squares.

The ionomer sheets were used as interlayer sheets to form glass laminates. Specifically, annealed glass sheets (100× 100×3 mm) were washed with a solution of trisodium phosphate (5 g/l) in de-ionized water at 50° C. for 5 min, then rinsed thoroughly with de-ionized water and dried. Six sheets of each ionomer (about 0.76 mm thick) were stacked together and placed between the two lites of glass sheet to form a pre-lamination assembly having an interlayer with a total thickness of about 180 mils (4.57 mm). The moisture level of the ionomer sheets was kept below 0.06 wt % by minimizing their exposure to ambient conditions (approximately 35% RH). The pre-lamination assembly was then stabilized by the application of polyester tape in several locations to maintain relative positioning of each layer with the glass lites. A nylon fabric strip was placed around the periphery of the assembly to facilitate air removal from within the layers.

The pre-lamination assembly was placed inside a nylon vacuum bag and sealed. A connection was made to a vacuum pump and the air within the bagged assembly was substantially removed by reducing the air pressure inside the bag to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas.

The pre-pressed assembly was placed in an air autoclave and the temperature and pressure were increased from ambient to 135° C. and 13.8 bar over 15 min. The assembly was maintained at these conditions for 30 min, after which, the resulting laminate was rapidly cooled (i.e., at Cooling Condition A of 2.5° C./min) to room temperature at ambient pressure. The as-obtained laminate was tested for haze in accordance with ASTM D1003 using a Haze-gard Plus hazemeter (BYK-Gardner, Columbia, Md.). After this measurement, the same laminate was heated to 120° C. in an oven and maintained at such temperature for 2 to 3 hours before it was slowly cooled (i.e., Cooling Condition B of 0.1° C./min) to room temperature and then tested for haze.

As shown by the Comparative Examples (CE4 to CE19), the haze levels of glass laminates comprising interlayer ionomers prepared by neutralizing prior art precursor acid copolymers are dependent on the cooling rate under which the laminates were obtained. In general, a slower cooling rate increases the laminates' haze. As illustrated by the data shown in Table 2, however, glass laminates comprising interlayer sheets made from ionomers prepared by neutralizing the precursor acid copolymers described above with sodium ion-containing bases (Comparative Examples CE1 to CE3) exhibit lower haze than glass laminates comprising interlayer ionomers prepared by neutralizing the prior art precursor acid copolymers (Comparative Examples CE4 to CE19). Additionally, the haze levels of the glass laminates in Comparative Examples CE1 to CE3 were not affected by the cooling rate under which the laminates were obtained.

TABLE 1

| Extruder Zone | Temperature (° C.) |
| --- | --- |
| Feed | Ambient |
| Zone 1 | 100-170 |
| Zone 2 | 150-210 |
| Zone 3 | 170-230 |
| Adapter | 170-230 |
| Die | 170-230 |

TABLE 2

| Example | Single Phase[1] | MAA (wt %)[2] | MFR (Base Resin)[3] | % Neut. (Sodium)[4] | MFR (Ionomer)[5] | Freeze Enthalpy (j/g) | Laminate Haze Cooling Condition A | Laminate Haze Cooling Condition B |
|---|---|---|---|---|---|---|---|---|
| CE1 | Yes | 23 | 270 | 43 | 3.2 | n.d.[6] | 0.7 | 1.1 |
| CE2 | Yes | 23 | 270 | 52 | 0.8 | n.d.[6] | 1.2 | 1.4 |
| CE3 | Yes | 22 | 350 | 53 | 2.5 | n.d.[6] | 0.6 | 0.6 |
| CE4 | Yes | 23 | 270 | 33 | 8.2 | 3.13 | 0.9 | 9.8 |
| CE5 | Yes | 23 | 270 | 26 | 16.0 | 7.32 | 5.3 | 21.6 |
| CE6 | Yes | 23 | 270 | 14 | 40.0 | 21.97 | 5.1 | 59.1 |
| CE7 | No | 22 | 25 | 38 | 0.4 | 4.38 | 1.2 | 8.6 |
| CE8 | No | 22 | 25 | 30 | 0.9 | 13.36 | 3.4 | 11.9 |
| CE9 | No | 22 | 25 | 25 | 1.5 | 16.31 | 3.8 | 17.2 |
| CE10 | No | 22 | 25 | 20 | 2.3 | 20.95 | 3.2 | 23.5 |
| CE11 | No | 22 | 25 | 15 | 3.4 | 27.15 | 2.5 | 33.5 |
| CE12 | No | 22 | 30 | 32 | 1.2 | 10.18 | 1.9 | 10.8 |
| CE13 | No | 22 | 30 | 32 | 1.2 | 16.09 | 2.6 | 14.4 |
| CE14 | No | 22 | 25 | 26 | 1.8 | 14.22 | 1.8 | 18.7 |
| CE15 | No | 21 | 30 | 29 | 2.0 | 21.67 | 1.5 | 21.2 |
| CE16 | No | 20 | 350 | 49 | 3.2 | 4.4 | 1.1 | 12.5 |
| CE17 | No | 20 | 12 | 23 | 0.5 | 25.47 | 2.6 | 26.7 |
| CE18 | No | 19 | 225 | 45 | 4.5 | 10.81 | 3.1 | 27.5 |
| CE19 | No | 19 | 60 | 37 | 2.6 | 18.20 | 1.5 | 50.8 |

[1]During the polymerization process, a single phase was maintained throughout the reactor;
[2]Weight percent of copolymerized units of methacrylic acid comprised in the precursor acid copolymer, from which the ionomer that forms the laminate interlayer sheet is derived;
[3]The melt flow rate (MFR) of the precursor acid copolymer was calculated based on the MFR of the ionomer;
[4]% neut. Sodium is the percentage of carboxylic acid groups present in the precursor acid copolymer which have been neutralized;
[5]The melt flow rate (MFR) of the ionomer, as determined in accordance with ASTM D1238 at 190° C. and 2.16 kg;
[6]"n.d." means that the freeze enthalpy is not detectable, when measured in accordance with ASTM D3418-03.

Examples E1 to E7 and Comparative Examples CE20 to CE24

The ionomers used in Comparative Examples CE20 to CE24 were prepared in substantially the same manner as described above for Comparative Examples CE1 to CE19, except that a solution of zinc acetate or zinc oxide concentrate was used instead of the solution of sodium hydroxide in preparing the ionomers used in CE22 and CE23. In preparing the ionomers used in Examples E1 to E3, a process similar to that used in Comparative Examples CE1 to CE19 was followed, except that the precursor acid copolymer was first neutralized by injecting an appropriate amount of sodium hydroxide solution and then injecting an appropriate amount of zinc acetate solution. The ionomer used in Example E4 was prepared by melt blending 75 wt % of the ionomer used in Comparative Example CE21 and 25 wt % of the ionomer used in Comparative Example CE22. The ionomer used in Example E5 was prepared by melt blending 50 wt % of the ionomer used in Comparative Example CE21 and 50 wt % of the ionomer used in Comparative Example CE22. The ionomer used in Example E6 was prepared by melt blending 25 wt % of the ionomer used in Comparative Example CE21 and 75 wt % of the ionomer used in Comparative Example CE22. The ionomer used in Example E7 was prepared by melt blending 50 wt % of the ionomer used in Comparative Example CE22 and 50 wt % of the ionomer used in Comparative Example CE24.

Using an extrusion process similar to those described above, the ionomer resins used in Example E1 to E7 and Comparative Example CE20 to CE24 were formed into nominally 30 mil (0.76 mm) or 33 mil (0.84 mm) thick sheets and cut into 300×300 mm squares. The as-extruded ionomer squares are believed to be substantially free of water. If not used within a short time for further experiments, the ionomer squares were stored in moisture-barrier packaging (foil envelopes) in the interval.

The ionomer sheets were trimmed to dimensions of 100×50×0.76 mm, weighed, and immersed in water at 23° C. for 1000 hours. After removal from the water, the sheets were blotted to remove residual surface moisture and then re-weighed. The difference in weight before and after water immersion divided by the sheet weight before water immersion was calculated as the moisture weight gain percent (%), which is summarized in Table 3.

Using a lamination process similar to those described above, a second set of ionomer sheets were laminated between two annealed glass sheets (100×100×3 mm) to form glass laminates and the percent haze of each laminate was determined under the conditions of Cooling Condition A or Cooling Condition B. Results are shown in Table 3. In some examples (Comparative Examples CE21, CE22, CE24, and Examples E4 to E7), after the lamination process was complete, the laminates were further processed using a protocol referred to herein as "Cooling Condition C". This protocol consists of 1) heating a laminate in an air oven by raising the temperature from ambient temperature to 70° C. over a period of 9 minutes, 2) maintaining a temperature of 70° C. for 15 minutes, 3) raising the temperature to 125° C. over a period of 55 minutes, 4) maintaining the temperature at 125° C. for 15 minutes, 5) cooling from 125° C. to 90° C. over a period of 7 minutes, 6) maintaining a temperature of 90° C. for 15 minutes, and 7) cooling from 90° C. to 25° C. over a period of 10 hours and 50 minutes. The thus-obtained laminates were then tested for percent haze. Results are shown in Table 3.

The results reported in Table 3 demonstrate that, in general, laminated sheets of zinc ionomers (Comparative Examples CE22 and CE23) tend to exhibit poorer optical properties than laminated sheets of sodium ionomers (Comparative Examples CE20, CE21, and CE24). The inclusion of zinc cations improves the moisture resistance of the resulting sodium/zinc ionomer sheets compared to that of sheets of sodium ionomers. Additionally, the inclusion of the zinc cations has no or very minimal effects on the optical properties (as shown by the lower haze levels) of the resulting mixed ionomers, especially at higher sodium/zinc cation ratios.

While certain of the preferred embodiments of the present invention have been described and specifically exemplified above, it is not intended that the invention be limited to such embodiments. Various modifications may be made without departing from the scope and spirit of the present invention, as set forth in the following claims.

TABLE 3

| Sample | MAA (wt %) | Freeze Enthalpy (j/g) | MFR (g/10 min) % Neut (Base Resin) | % Neut (Na:Zn mole ration) | MFR (g/10 min) (ionomer) | Haze (%) Cooling Rate A | Haze (%) Cooling Rate B | Haze (%) Cooling Rate C | Moisture Gain (wt %) |
|---|---|---|---|---|---|---|---|---|---|
| CE20 | 19 | 17.3 | 60 | 39 (100:0) | 2.6 | 1[1] | 22.5[1] | — | |
| CE21 | 23.2 | — | 270 | 43.2 (100:0) | 3.2 | 0.7[1] | 1.1[1] | 0.4[2] | 9.2[3] |
| E1 | 23.2 | — | 270 | 54.6 (73.8:26.2) | 0.89 | 0.98[1] | 0.67[1] | — | 2.9[3] |
| E2 | 23.2 | 0.82 | 270 | 44.6 (65.9:44.1) | 3.1 | 1[1] | 0.73[1] | — | 0.81[3] |
| E3 | 23.2 | 4.73 | 270 | 34.8 (51.6:48.4) | 7.2 | 1.22[1] | 10.04[1] | — | 0.42[3] |
| CE22 | 23.2 | 12.74 | 270 | 34.9 (0:100) | 6.6 | 6.3[1] | 52.6[1] | 28.2[2] | 0.51[3] |
| CE23 | 19 | — | 250 | 39 (0:100) | 4 | 11.6[1] | 69.5[1] | — | — |
| E4 | 23.2 | 1.04 | 270 | 41.1 (81.1:11.9) | — | — | — | 4[2] | — |
| E5 | 23.2 | 2.80 | 270 | 39.1 (71.2:28.8) | — | — | — | 3.6[2] | — |
| E6 | 23.2 | 7.34 | 270 | 37 (45.2:54.8) | — | — | — | 11.7[2] | — |
| CE24 | 23.2 | — | 270 | 52.2 (100:0) | 0.8 | — | — | 0.9[2] | — |
| E7 | 23.2 | — | 270 | 43.6 (75:25) | — | — | — | 1.4[2] | — |

[1]The glass laminates used in these examples have three layers of 0.76 mm thick ionomer sheets sandwiched between the two glass sheets;
[2]The glass laminates used in these examples have three layers of 0.84 mm thick ionomer sheets sandwiched between the two glass sheets;
[3]The ionomer sheets used in these examples have a size of 100 × 50 × 0.76 mm.

What is claimed is:

1. A laminate comprising at least one interlayer sheet that is laminated to one or more rigid sheets, to one or more other interlayer sheets, or to one or more film layers, said at least one interlayer sheet comprising a sodium/zinc mixed ionomer composition, said sodium/zinc mixed ionomer composition comprising a sodium/zinc mixed ionomer that is the neutralization product of a precursor acid copolymer;
   wherein (a)(i) the precursor acid copolymer comprises copolymerized units of ethylene and about 20 to about 30 wt %, based on the total weight of the precursor acid copolymer, of copolymerized units of an α,β-ethylenically unsaturated carboxylic acid selected from the group consisting of acrylic acid and methacrylic acid;
   wherein (ii) the precursor acid copolymer has a melt flow rate of about 70 to about 4000 g/10 min, as determined in accordance with ASTM D1238 at 190° C. and 2.16 kg;
   wherein (iii) the precursor acid copolymer, being neutralized to a level of about 40% to about 90% based on the total number of the carboxylic acid groups present in the precursor acid copolymer, produces a sodium ionomer, said sodium ionomer comprising carboxylate groups and counterions, and said counterions consisting essentially of sodium cations, and wherein (iv) the sodium ionomer has a melt flow rate of about 0.7 to about 25 g/10 min and a freeze enthalpy that is not detectable or that is less than about 3.0 j/g, as determined by differential scanning calorimetry in accordance with ASTM D3418; and
   (b) said sodium/zinc mixed ionomer comprises carboxylate groups and a combination of counterions; said combination of counterions consisting essentially of about 5 to about 95 equivalent % of sodium cations, and about 95 to 5 equivalent % of zinc cations, based on the total number of equivalents of carboxylate groups in the sodium/zinc mixed ionomer.

2. The laminate of claim 1, wherein about 30% to about 90% of the acid moieties of the precursor acid copolymer are neutralized.

3. The laminate of claim 1, wherein about 40% to about 70% of the acid moieties of the precursor acid copolymer are neutralized.

4. The laminate of claim 1, wherein the sodium/zinc mixed ionomer has a melt flow rate (MFR) of about 0.7 to about 25 g/10 min, as determined in accordance with ASTM D1238 at 190° C. and 2.16 kg.

5. The laminate of claim 1, wherein the precursor acid copolymer comprises about 20 to about 25 wt % of copolymerized units of the a,β-ethylenically unsaturated carboxylic acid.

6. The laminate of claim 1, wherein the combination of counterions consists essentially of about 50 to about 95 equiv % of the sodium cations, and about 5 to about 50 equiv % of the zinc cations.

7. The laminate of claim 1, wherein the interlayer sheet is in the form of a monolayer sheet and further wherein the monolayer sheet consists essentially of the sodium/zinc mixed ionomer.

8. The laminate of claim 1, wherein the interlayer sheet is in the form of a multilayer sheet and comprises two or more sub-layers; wherein at least one of the sub-layers consists essentially of the sodium/zinc mixed ionomer and the other sub-layer(s) comprise a polymer selected from the group consisting of acid copolymers, ionomers of acid copolymers, poly(ethylene vinyl acetates), poly(vinyl acetals), polyurethanes, polyvinylchlorides, polyethylenes, polyolefin block elastomers, copolymers of an α-olefin and an α,β-ethylenically unsaturated carboxylic acid ester, silicone elastomers, epoxy resins, and combinations of two or more thereof; and wherein the other sub-layers, if two or more are present, are the same or different.

9. The laminate of claim 1, wherein the rigid sheet comprises a material having a modulus of about 690 MPa or greater, as determined in accordance with ASTM D638, and the material is selected from the group consisting of glass, metal, ceramic, and polymers.

10. The laminate of claim 1, wherein the film layer is a metal film or a polymeric film comprising one or more materials selected from the group consisting of polyesters, polycarbonates, polyolefins, norbornene polymers, polystyrenes, styrene-acrylate copolymers, acrylonitrile-styrene copolymers, polysulfones, polyamides, polyurethanes, acrylic polymers, cellulose acetates, cellophanes, vinyl chloride polymers and fluoropolymers.

11. The laminate of claim 1, further comprising one or more other polymeric interlayers, wherein the one or more other polymeric interlayers comprise one or more materials selected from the group consisting of poly(vinyl acetals), poly(vinyl chlorides), polyurethanes, ethylene/vinyl acetate copolymers, acid copolymers, and ionomers; and wherein the other polymeric interlayers, if two or more are present, are the same or different.

12. The laminate of claim 1, wherein the at least one interlayer sheet comprising the sodium/zinc mixed ionomer is laminated between two glass sheets.

13. The laminate of claim 1, wherein the at least one interlayer sheet comprising the sodium/zinc mixed ionomer is laminated between a glass sheet and a polyester film; said polyester film having a surface that is adjacent to the interlayer sheet and a surface that is facing away from the interlayer sheet; and wherein surface that is facing away from the interlayer sheet is coated with an abrasion resistant hardcoat.

14. The laminate of claim 1, which comprises n rigid sheet or film layers and (n−1) interlayer sheets, wherein (a) each of the adjacent pairs of the rigid sheet or film layers is interspaced by one of the interlayer sheets; (b) at least one of the interlayer sheets comprises the sodium/zinc mixed ionomer composition, and (c) n is an integer such that $2 \leq n \leq 10$.

15. The laminate of claim 14, which comprises an impact zone that faces to the impact force and an anti-spall zone that is firmly adhered to the impact zone and faces away from the impact force, wherein (A) the impact zone is formed by the n rigid sheets and the (n−1) interlayer sheets; and (B) the antispall zone comprises an additional polymer sheet and an additional film layer with a first surface of the additional polymer sheet adhered firmly to the impact zone and a second surface of the polymer sheet adhered firmly to the additional film layer.

16. The laminate of claim 15, wherein (A) each of the n rigid sheets is a glass sheet; (B) each of the (n−1) polymer interlayer sheets comprises the sodium/zinc mixed ionomer composition; (C) the additional polymer sheet comprises a poly(vinyl butyral); and (D) the additional polymer film is a poly(ethylene terephthalate) film having a surface that is opposite from the impact zone and having a hardcoat adhered to at least a portion of the surface.

* * * * *